(No Model.) 3 Sheets—Sheet 1.

A. KITSON.
GAS PRODUCER.

No. 596,018. Patented Dec. 21, 1897.

WITNESSES:

INVENTOR
Arthur Kitson
BY
H. Parker Smith
ATTORNEY (No Model.)  3 Sheets—Sheet 3.

A. KITSON.
GAS PRODUCER.

No. 596,018.  Patented Dec. 21, 1897.

WITNESSES:
W. H. Humphrey.
J. E. Pearson.

INVENTOR
Arthur Kitson
BY H. Parker Smith
ATTORNEY

UNITED STATES PATENT OFFICE.

ARTHUR KITSON, OF PHILADELPHIA, PENNSYLVANIA.

GAS-PRODUCER.

SPECIFICATION forming part of Letters Patent No. 596,018, dated December 21, 1897.

Application filed July 23, 1897. Serial No. 645,709. (No model.)

*To all whom it may concern:*

Be it known that I, ARTHUR KITSON, a subject of the Queen of Great Britain, residing at Philadelphia, in the county of Philadelphia and State of Pennsylvania, have invented a certain new and useful Improvement in Apparatus for the Manufacture of Gas, of which the following is a full and complete specification, reference being had to the accompanying drawings.

The object of this invention is to gasify soft coal in a cupola-furnace and prevent caking formations and clinker by agitating the entire bed of fuel, also to convert all the volatile matter, which in other producers condenses in the pipes to form tar, into a fixed gas.

In the patent granted to myself and Thomas Walker, dated October 17, 1893, No. 507,073, is shown means and mechanism for keeping a deep bed of fuel in a continuous state of agitation by revolving slowly but constantly a hearth upon which the fuel rests and whose surface is considerably inclined from the horizontal. The apparatus therein described is designed to employ anthracite or semibituminous coal, but when desired to employ soft or bituminous coals a modification becomes necessary to prevent the upper portion of the charge from caking over and to capture the tarry and other vapors, which would otherwise escape. To accomplish this, I have designed the improved construction illustrated and described in the following specification and the three sheets of drawings, in which latter—

Figure 1:
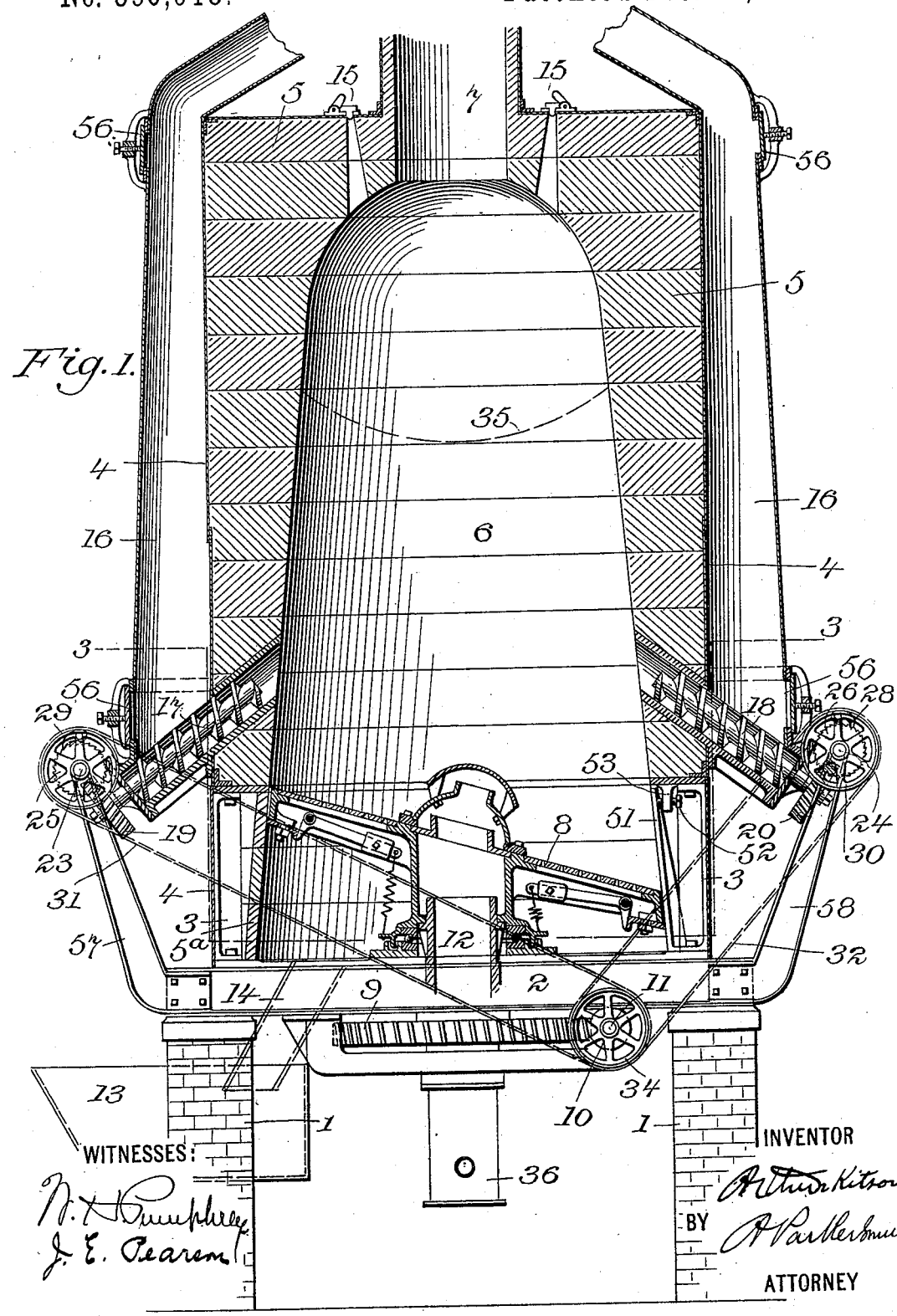
Figure 2:
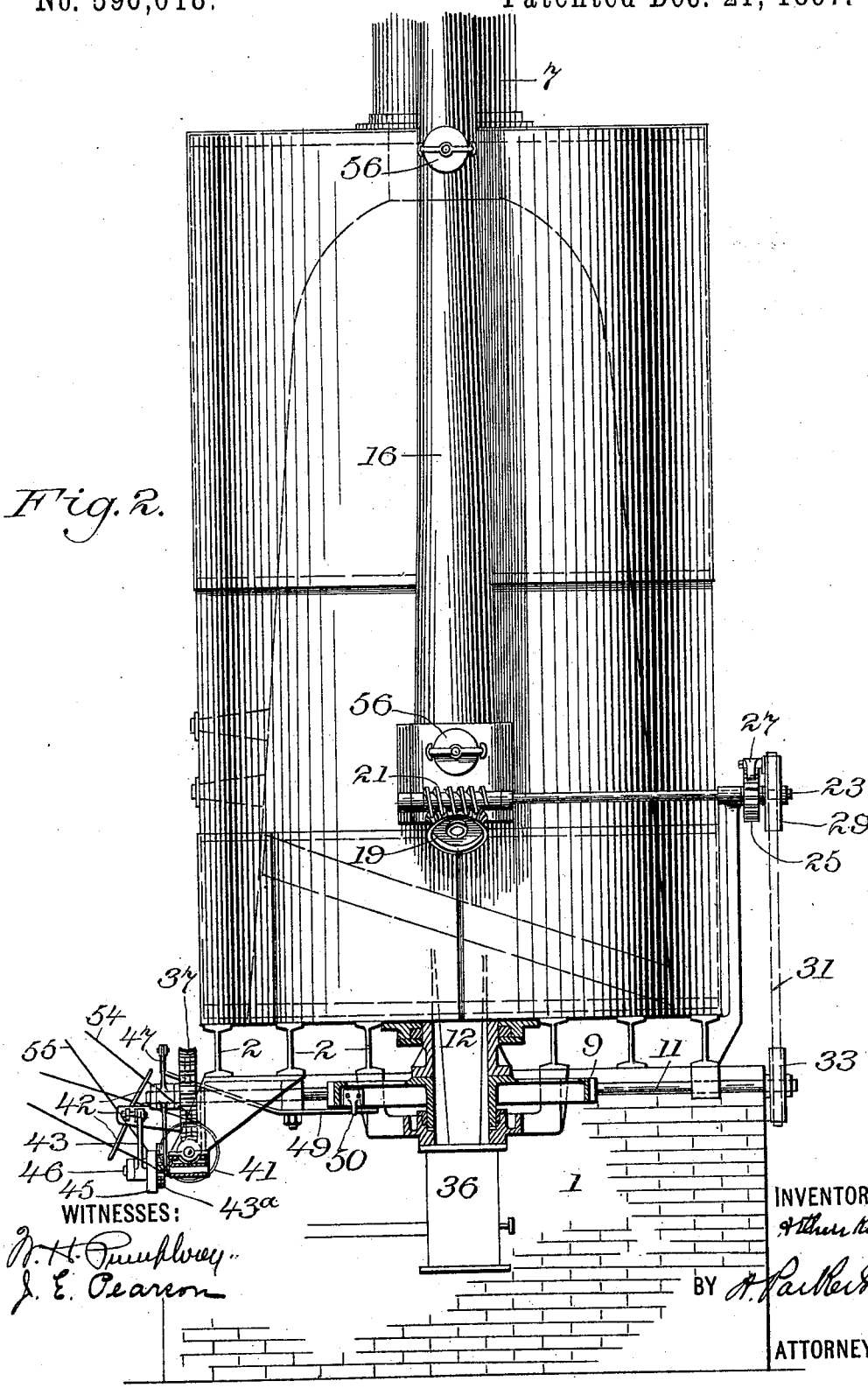
Figure 3:
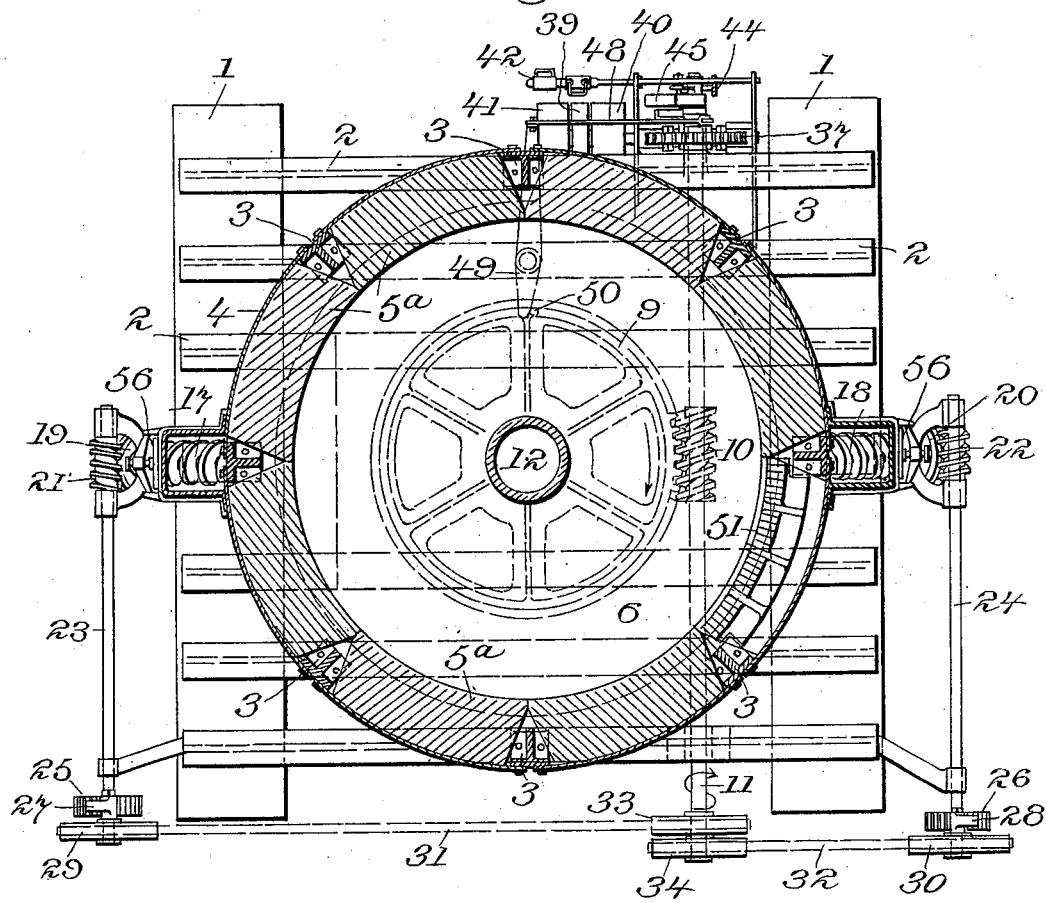
Figure 4:
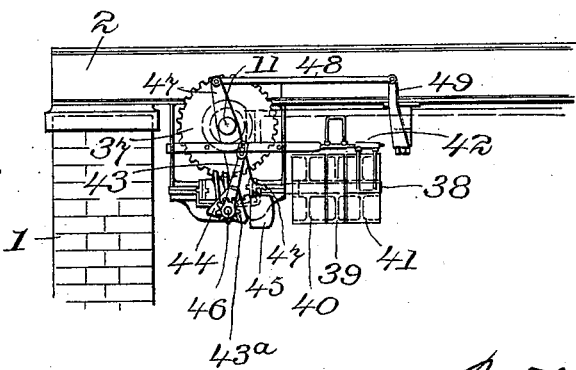

Figure 1 is a vertical central section of my improved apparatus. Fig. 2 is a side elevation and partial section taken at right angles to that shown in Fig. 1. Fig. 3 is a horizontal section on the broken line 3 3 of Fig. 1, and Fig. 4 is a side elevation of the belt-shifting gear.

Throughout the drawings like reference-figures refer to like parts.

1 represents the pillars, on which the furnace is supported by means of the I-beams 2 2. The vertical pillars 3 3 rest on the base-plate and support a circular ring carrying the walls 5 of the combustion-chamber 6. These are preferably made of fire-brick and are inclined inwardly, as shown.

4 represents a shell, preferably of sheet-iron, inclosing the entire structure, and 7 is a gas take-off at the upper end of the combustion-chamber.

$5^a$ represents the walls of the ash-pit, which are in line with the walls 5 of the combustion-chamber.

8 is a rotating inclined hearth of the general character described in the patent to myself and Walker above referred to, which is rotated by means of the worm-gear 9, with which the worm 10 on the main driving-shaft 11 meshes.

12 represents a central passage-way for the blast, which comes in through the pipe 36, and 14 is a pipe through which the ashes may be discharged into the water seal 13.

15 15 represent small ports through which the gas may be allowed to escape and ignited for the purpose of determining the quality of gas being produced.

The fuel is fed by gravity from any suitable form of hopper (not shown) down through the chutes 16 16, which flare slightly downward. 56 56 represent manholes in said chutes. At the bottom of these chutes are screw conveyers 17 18, which force the fuel into the combustion-chamber 6 and are preferably inclined upward, as shown. These screw conveyers do not extend beyond the inner surface of the combustion-chamber wall, the object being to drop the fuel at the outer circumference of the combustion-chamber. These screw conveyers are operated by means of the worm-wheels 19 and 20, meshing with the worms 21 and 22 on the shafts 23 and 24, which in turn are revolved by the ratchet-wheels 25 and 26, operated by the pawls 27 and 28, mounted on the sprocket wheels or pulleys 29 and 30, which in turn are driven by the sprocket chains or belts 31 and 32, running over the sprocket wheels or pulleys 33 and 34, keyed to the shaft 11.

35 represents the normal fuel-line in the combustion-chamber.

Intermittent rotation in opposite directions is given through the main driving-shaft 11 by means of the worm-wheel 37, keyed thereon and meshing with the worm on the shaft 38, on which is keyed the pulley 39. 40 and 41 are loose pulleys on said shaft, and 42 is a reciprocating belt-shifter which alternately throws the belt 54 and the cross-belt 55 onto the driving-pulley 39. The mechanism for shifting the belt-shifter 42 consists of the slotted lever 43, pivoted and carrying with it the triangular stirrup 44. The weight 45 is pivoted on the same stud 46 as is the lever 43 and is oscillated from one side to the other by the pinion 43$^a$, which is given intermittent rotation in opposite direction by the toothed sector 47, operated by the link 48, pivoted to the reversing-lever 49, the short end of which is struck by the stud 50 on the worm-wheel 9.

51 represents a removable door through which access to the hearth and ash-pit may be obtained. The upper end of this door is adjustably held in position by one or more screw-bolts 52 in lugs 53.

57 and 58 represent the brackets in which the shafts 23 and 24 are mounted.

The mode of operation of my invention is as follows: Supposing the driving-belt 55 to be running on the driving-pulley 39, rotation to the driving-shaft 11 will be given in the direction of the arrow shown in Fig. 3. This will rotate the worm-wheel 9 and with it the hearth 8 in the direction of the hands of a watch, looking at Fig. 3. When the stud 50 has completed one revolution, it will strike against the other side of the reversing-lever 49 and cause the same to pull the toothed sector 47 to the left, Fig. 4, and cause the pinion 45$^a$ to lift the weight 45 from the position shown in in Fig. 4 and throw it to the left. When said weight falls in the left-hand position, it will strike the other side of the stirrup 44 and throw the slotted lever 43 to the left, which latter will pull the belt-shifter 42 along with it, removing the belt 55 from the driving-pulley 39 and shifting the belt 54 onto the same. The driving-shaft 38 will then rotate in the opposite direction, reversing the motion of the rotating hearth until it returns to the position shown in Fig. 3, when the reversing-lever 49 will be struck and the operation above described repeated. This particular portion of my apparatus is described and claimed in my pending application, Serial No. 658,445, filed November 13, 1897.

During the rotation of the driving-shaft 11 in the direction shown by the arrow the pawl 27 will slip over the ratchet-wheel 25, and the screw conveyer 17 will remain stationary. The pawl 26, however, will engage the ratchet-wheel 28, and the screw conveyer 18 will be forcing fuel into the combustion-chamber. When the driving-shaft 11 reverses, it is evident that the screw conveyer 17 will be brought into operation and the screw conveyer 18 remain stationary.

The advantages of this apparatus, in addition to those set forth in the patent to myself and Walker, consist in the discharge of the fuel into the zone of fiercest combustion, in which all the volatile constituents of the soft coal are immediately transformed into fixed gases and forced up through the bed of unconsumed and partially-consumed fuel above. The alternate action of the conveyers tends to keep the bed of fuel well broken up, forcing it first to one side and then to the other and so preventing any caking or tendency of the charge to "chimney." This action is of course assisted by the rotating inclined hearth and by the inclined walls of the combustion-chamber, which tend to produce a continual movement of the fuel on itself as it is raised and lowered by the combined action of the conveyers and the rotating hearth. The rotating grate coacts with the screw conveyers to distribute the fuel evenly about the circumference of the combustion-chamber by continually removing the said fuel as it is dropped from the mouth of the conveyer to one side. It is evident that without the rotating grate the fuel would be deposited in a heap immediately under the mouth of the screw conveyer, thus interfering with the even combustion of the same and the satisfactory working of the producer. The blast is forced up through the pipe 12, and the gas goes off through the take-off 7, in the well-understood manner.

Of course various changes in the details of my construction could be made without departing from the spirit and scope of the invention so long as the relative arrangement and operation of parts is preserved. Different trains of mechanism to transmit the desired motions and reversals of motions might be employed, and the opposite screw conveyers might be operated simultaneously by interposing proper reversing mechanism between the shaft 11 and the sprocket-wheels 33 and 34. While I have shown two screw conveyers, it is evident that any number might be employed.

Having therefore described my invention, what I claim as new, and desire to protect by Letters Patent, is—

1. The combination of the combustion-chamber, the hearth inclined to the plane of the horizon, but rotating on a vertical axis, and one or more screw conveyers passing through the walls of said combustion-chamber, and terminating at the surface of said walls which discharge fuel into the combustion-chamber below the normal fuel-line substantially as described.

2. The combination of the combustion-chamber, the hearth inclined to the plane of the horizon, but rotating on a vertical axis, and one or more screw conveyers passing through the walls of said combustion-chamber, and terminating at the surface of said walls which are inclined upwardly and discharge fuel into the combustion-chamber below the normal fuel-line substantially as described.

3. The combination of the combustion-chamber, having inwardly-inclined walls, the hearth inclined to the plane of the horizon, but rotating on a vertical axis, and one or more screw conveyers passing through the walls of said combustion-chamber, and terminating at the surface of said walls which discharge fuel into the combustion-chamber below the normal fuel-line substantially as described.

4. The combination of the combustion-chamber, the constantly-rotating hearth, and one or more screw conveyers passing through the walls of said combustion-chamber, and terminating at the surface of said walls which discharge fuel through the walls of the combustion-chamber and below the normal fuel-line substantially as described.

5. The combination of the combustion-chamber, the constantly-rotating hearth, and one or more screw conveyers passing through the walls of said combustion-chamber, and terminating at the surface of said wall which discharge fuel through the walls of the combustion-chamber below the normal fuel-line substantially as described.

6. The combination of the combustion-chamber, the constantly-rotating hearth, and one or more screw conveyers passing through the walls of said combustion-chamber, and terminating at the surface of said walls which are inclined upwardly and discharge fuel through the walls of the combustion-chamber below the normal fuel-line substantially as described.

7. The combination of the combustion-chamber, the constantly-rotating hearth, the screw conveyers passing through the walls of said combustion-chamber, and terminating at the surface of said walls and below the normal fuel-line which discharge fuel into said combustion-chamber, the driving-shaft, and mechanism whereby said driving-shaft rotates both the hearth and the screw conveyers, substantially as described.

8. The combination of the combustion-chamber, the rotating hearth, the driving-shaft, which is geared to the hearth, mechanism for automatically and periodically reversing the direction of rotation of said shaft, one or more pairs of screw conveyers which discharge fuel into said combustion-chamber, and ratchet mechanism which conveys the opposite rotations of said shaft to opposite members of said pairs of conveyers substantially as described.

9. The combination of the combustion-chamber, one or more pairs of screw conveyers which pass through the walls of said combustion-chamber and terminate at the surface thereof below the normal fuel-line, connections whereby fuel is fed to said screw conveyers, and mechanism for alternately operating the opposite members of each of said pairs of screw conveyers, substantially as described.

In testimony whereof I have affixed my signature in the presence of two witnesses.

ARTHUR KITSON.

Witnesses:
H. EMERSON,
PHOEBE A. REED.